Figure 1:
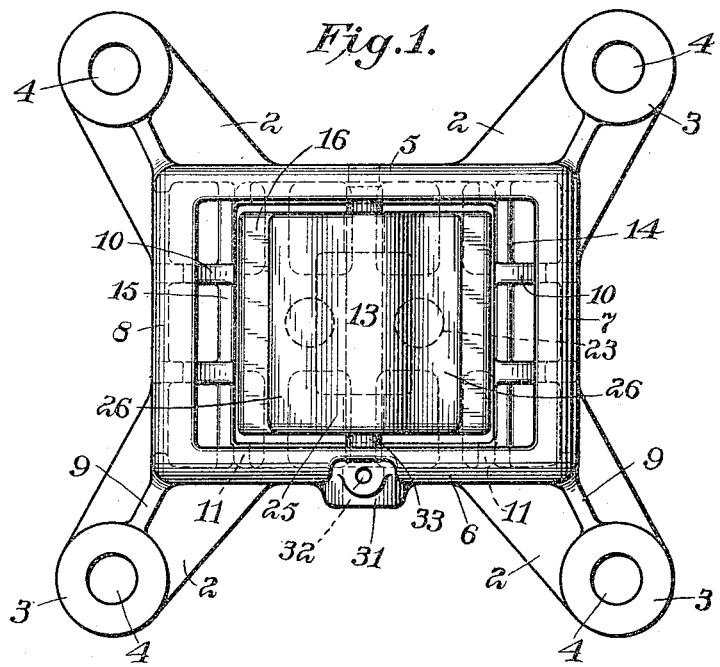

W. E. WINE.
SIDE BEARING.
APPLICATION FILED OCT. 27, 1916.

1,224,345.

Patented May 1, 1917.
2 SHEETS—SHEET 1.

INVENTOR:

William E. Wine, by Parker Cook
Atty.

W. E. WINE.
SIDE BEARING.
APPLICATION FILED OCT. 27, 1916.

1,224,345.

Patented May 1, 1917.
2 SHEETS—SHEET 2.

INVENTOR:
William E. Wine,
by Parker Cook
Atty.

UNITED STATES PATENT OFFICE.

WILLIAM E. WINE, OF TOLEDO, OHIO.

SIDE BEARING.

1,224,345.   Specification of Letters Patent.   Patented May 1, 1917.

Application filed October 27, 1916. Serial No. 128,064.

*To all whom it may concern:*

Be it known that I, WILLIAM E. WINE, a citizen of the United States residing at Toledo, in the county of Lucas and State of Ohio, have invented certain new and useful Improvements in Side Bearings, of which the following is a specification.

My invention relates to a new and useful improvement in side-bearings for rail-way cars, and particularly to a self-centering side-bearing having an adjustable bearing plate therein.

Often times in assembling car parts it is impossible on account of slight inaccuracies of workmanship to locate the top bearing plate so that it will be in correct and exact alinement with the roller. Also the wear on the roller may cause it to become out of alinement, and instead of the bearing taking up the strain throughout its length it will contact at a point only, thus flattening the roller or bearing surface.

An object therefore of my invention is to provide a side-bearing that will yield freely with the movement between the body bearing and the truck bearing, and of such shape that the wear on its contacting surfaces will not damage it, nor interfere with its functions.

Still another object of my invention is to provide a self-centering bearing comprising a house member, a roller therein, and a bearing plate in said house member and beneath the said roller, which bearing plate is designed to rock transversely under said roller so that the roller can adjust itself to the body bearing.

Still another object of my invention is to provide a side-bearing comprising a base member or housing in which there is located an adjustable plate that is so arranged that it has a bearing surface extending throughout its entire length, thereby making all operating parts in compression without any bending parts whatever.

Still another object of my invention is to provide a side-bearing that consists of but three parts, that is, a base member, a roller member, and a bearing plate within said base member, also to provide a bearing that will not only function as a self-centering one but also permit the roller to adjust itself to the conditions prevalent in the body bearing.

Still another object of my invention is to provide a side-bearing that is very compact, strong, durable, easy to assemble and cheap to manufacture.

With these and other objects in view my invention consists in certain new and novel constructions and combination of parts as will be herein after more fully described and pointed out in the claims.

In the accompanying drawings Figure 1 is a top plan view of my improved side-bearing.

Figure 2:
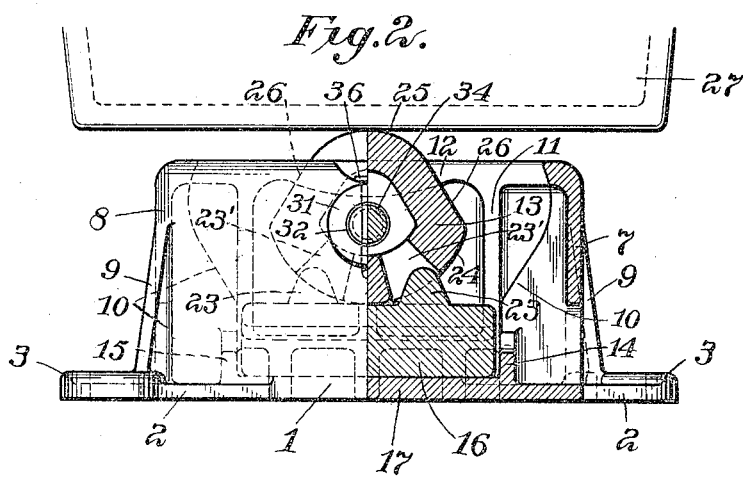

Fig. 2. is a side elevation, partly in section.

Figure 3:
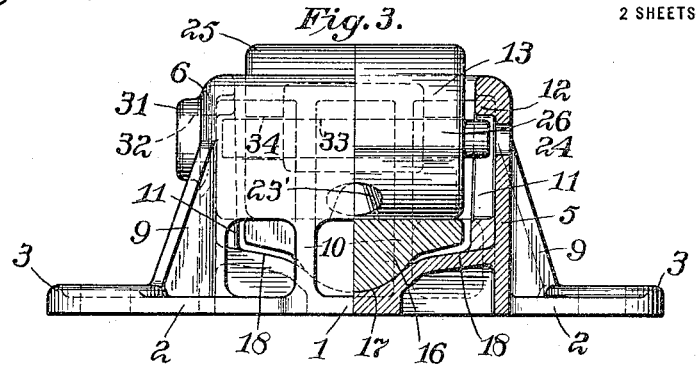

Fig. 3. is a similar view taken at a right angle.

Figure 4:
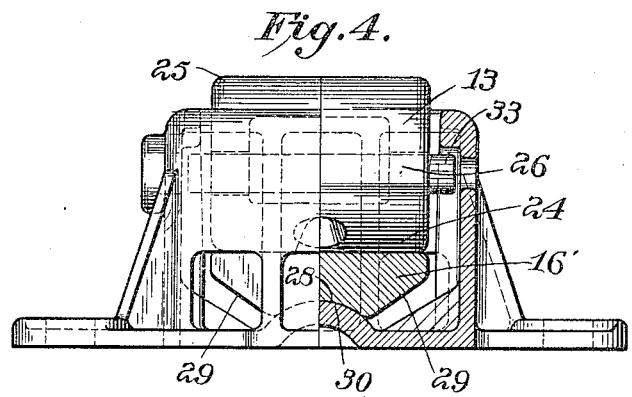

Fig. 4. is also an end view, partly in section, but of a modified form.

Figure 5:
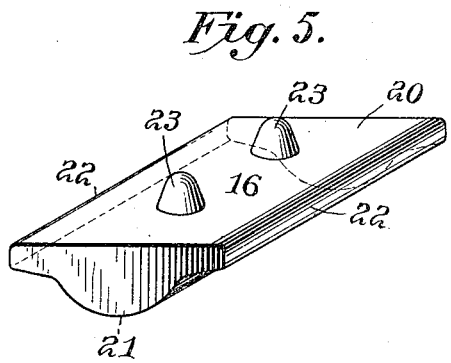

Fig. 5. is a perspective of the bearing plate, and

Figure 6:
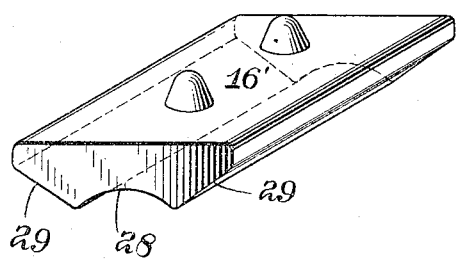

Fig. 6. is a perspective of the bearing that accompanies the modified form.

In the drawing a base plate 1, is shown having the outwardly extending arms 2, which arms are provided with the reinforced ends 3, which ends in turn are provided with the openings 4, for the reception of the bolts that secure the side bearing to the truck bolster. Formed integral with the base plate 1, are the sides 5 and 6, and the end walls 7 and 8, which sides and end walls form the box-like construction or what I have termed the base member of the side-bearing.

This base member is provided with a plurality of ribs such as the ribs 9, which extend from the sides and ends to the arms, the inner portion of the base member is also provided with certain ribs such as the vertical and inwardly extending ones 10, at each end of the bearing and also with ribs 11, on the side walls. These ribs 11 are connected by a rib 12, the ribs 11 and 12 acting as a limit to the roller member 13, hereinafter to be described. Ribs 14 and 15 are also shown that are parallel to the end walls and define the extremities of the pocket in which is located the adjustable bearing plate 16.

Extending horizontally of the base member and between the two ribs 14 and 15 is the inner bottom contacting surface. This surface is depressed as at 17, and has the upwardly extending sides 18.

Referring now for the moment to Fig. 5, the bearing plate 16 is shown as having a flat upper surface 20, a convex lower surface 21, which lower surface is designed to fit within the concave surface 17 formed in the base member.

The sides 22 of this plate 16 are on a slightly different angle to the angle of the sides 18, so that the said plate 16 may rock transversely in said bearing. This bearing plate 16 also has this convex surface 21 extending throughout its entire length so that a maximum bearing surface is thereby provided. On the surface 20 are also provided the two teeth 23.

Referring now to the other figures it will be noticed that situated within the base member is the roller 13, having a lower rolling surface 24, an upper rolling surface 25, and the inclined sides 26. The lower surface 24 is of greater radius than the upper rolling surface, thus causing the roller to center itself by gravity, the moment the body bearing 27 moves out of contact with the roller 13 of the side bearing. The inclined sides 26 are arranged as shown so that after the bearing moves to either of its limits a flat side will be presented to the body bearing 27.

Arranged in the lower surface 24 of the roller are the recesses 23' for the reception of the teeth 23, thus providing for the proper positioning of the roller 13 within the base member and with regard to the plate 16.

Referring now to the modification shown in Figs. 4 and 6 it is to be noticed that in this instance—referring first to Fig. 6—that the plate 16' is formed with a concaved under surface 28, and angularly shaped bottom walls 29. The base member in this instance is provided with a convexed under bearing surface 30.

In other words in the modified form, the bottom bearing plate 16' is concave and the bearing surface of the base plate 30 is convex which is exactly opposite to the arrangement of the bearing surfaces as shown in the preferred form.

In both instances that idea is to provide a bearing plate that will rock transversely to the housing, so that the roller may adjust itself to any irregularities or uneven surfaces that may be presented by the body bearing, and so that the bearing plate of the body bearing, the roller 13, and the bearing 16 will always be in correct alinement.

Formed on the side wall 6 is the boss 31, which is provided with an opening 32, for the reception of the pin 33 that is designed to extend through an opening 24 in the roller 13, which pin forms trunnions for retaining the roller in the housing or base member. Formed in the top of the boss 31 is another opening for the reception of a key 36, which is to be inserted after the pin 33, has been placed through the roller 13.

To assemble the side-bearing it is only necessary to place the bearing plate 16 within the base member, lay the roller on top of the plate 16, and place the pin 33 through the opening in the boss 31, and press the key 36 in the opening in the boss 31.

The advantages of a construction of this kind are readily apparent when it is remembered that the side-bearings are subjected to tremendous blows, and that a maximum bearing surface is greatly to be desired. By providing an adjustable bearing plate, the roller contacting therewith, the said plates may adjust themselves to the position of the body bearing.

It is to be understood that many slight changes might be made, such as changing the position of some of the ribs or adding more ribs, or changing the relative coöperation of the parts, without departing from the spirit and scope of the invention.

Having thus described my invention what I claim as new and desire to secure by Letters Patent is:

1. A side bearing comprising a base member having side and end walls forming a box like structure, a plate loosely fitting within said box like structure and supported by the bottom wall of said box like structure and capable of rocking along its longitudinal axis, a roller supported by said plate and means independent of the supporting plate for preventing the roller from escaping from the box like structure.

2. A side bearing comprising a box like structure and a plate capable of rocking throughout its longitudinal axis supported wholly by said bottom wall and a self-centering bearing supported wholly by said plate and coöperating means between the said plate and said roller for correctly alining said roller and means independent of supporting said roller for retaining the roller in its box like structure.

3. A side-bearing for railway cars comprising a base member having side and end walls forming a box-like structure, ribs in said box-like structure parallel with the said end walls, said base member having a fixed depressed central portion extending between said ribs, a bearing plate fitting within said box-like structure and between the said mentioned ribs and having a rounded under portion extending centrally thereof, said bearing plate capable of a rocking movement transverse of said base member, projections on the upper surface of said bearing plate and a roller provided with recesses in its lower surface to coöperate with the teeth on said bearing member and means for retaining the roller in the base member.

4. A side-bearing for railway cars, comprising in part, a base member having four outwardly extending arms, end and side walls forming a box-like structure, ribs extending from said walls to said outwardly extending arms strengthening ribs extending from said end walls inwardly, further ribs parallel with said end walls and a depressed lower bearing surface.

5. A side-bearing for railway cars, comprising in part, a base member formed of a base plate with end and side walls thereon, vertical and horizontally connecting ribs on the upper inner surface of said side walls, inwardly extending ribs from said end walls, other ribs parallel with said end walls and connecting with said last mentioned inwardly extending ribs, the bottom of said base member being depressed between the ribs that are parallel to the end walls and a plurality of pockets formed along the depressed central bottom portion.

6. A side-bearing for railway cars, comprising a base member in the form of a box-like structure, an irregular shaped bottom in said base member, a bearing plate also provided with an irregular shaped bottom resting within said box-like structure and capable of a rocking movement, a roller coöperating with said bearing plate, a trunnion passing through said roller to limit the horizontal movement and retain the roller in the box-like structure, a boss formed on one of the walls and provided with an opening therein for the insertion of said trunnion, and means for retaining the trunnion in the box-like structure.

In testimony whereof I affix my signature.

WILLIAM E. WINE.

Copies of this patent may be obtained for five cents each, by addressing the "Commissioner of Patents, Washington, D. C."